Dec. 26, 1933.    C. W. PARKER    1,941,135
LUBRICATING DEVICE
Original Filed April 26, 1928
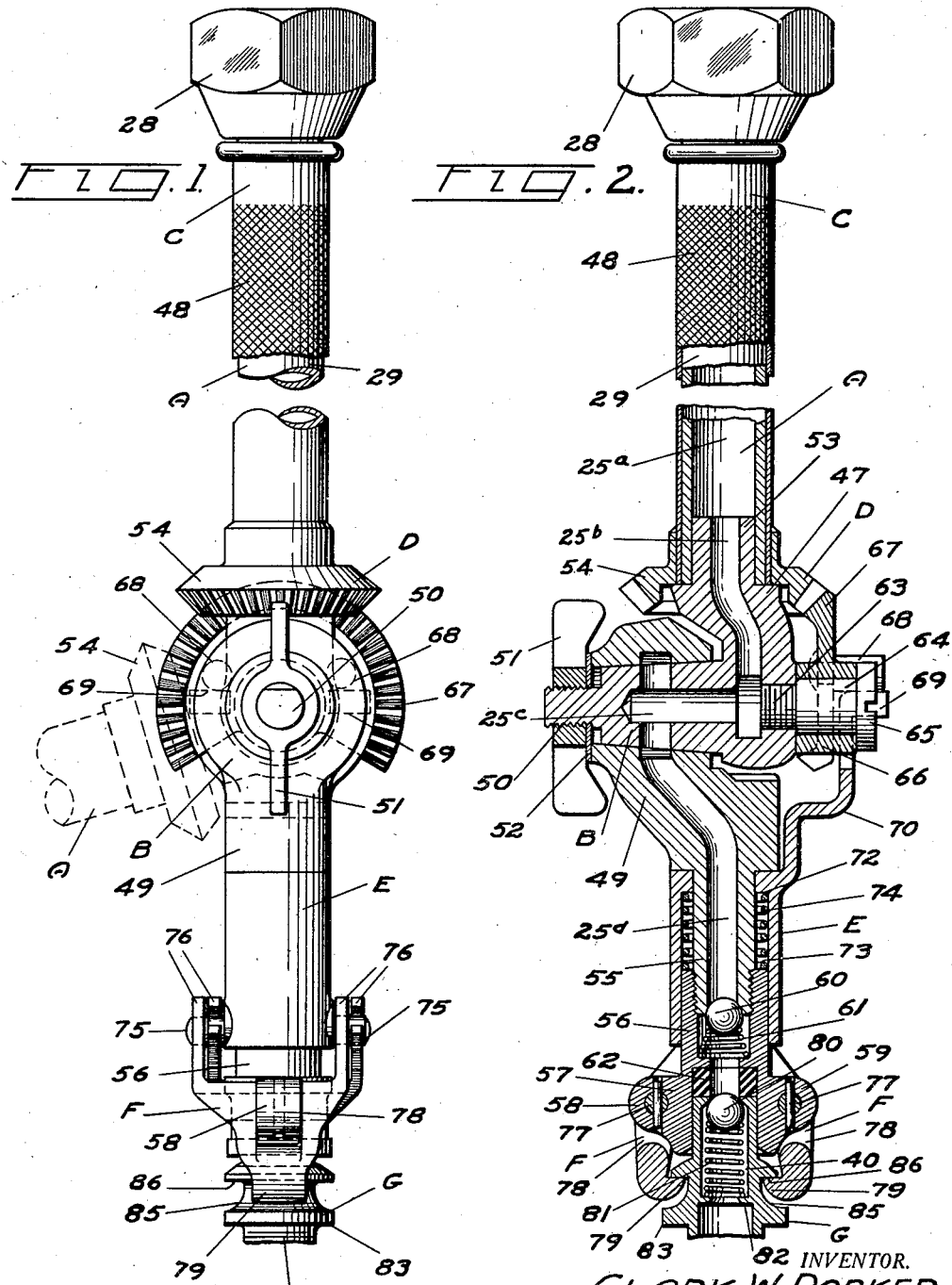
INVENTOR.
CLARK W. PARKER
BY John A. Watson
ATTORNEY.

Patented Dec. 26, 1933

1,941,135

UNITED STATES PATENT OFFICE 1,941,135

LUBRICATING DEVICE

Clark W. Parker, Brewster, N. Y., assignor to The Lubrication Corporation, South Bend, Ind., a corporation of Delaware Original application April 26, 1928, Serial No. 272,921. Divided and this application May 10, 1932. Serial No. 610,473

4 Claims. (Cl. 285—170)

This invention relates to improvements in lubricating devices and more particularly to apparatus for conducting lubricant to a lubricant receiving nipple or fitting under high pressure and through a relatively wide angular range of approach with respect to the fitting.

This application is a division of my co-pending application for Method of pressure lubrication and system of means therefor, Serial No. 272,921, filed April 26, 1928.

An object of my invention is to provide a lubricant conducting apparatus including a pivotally jointed conduit having a discharge nozzle and means for clamping the nozzle upon a lubricant receiving fitting operable through the joint of the conduit from a point remote from the nozzle.

A further object is to provide a lubricant conducting apparatus incorporating novel clamping mechanism for holding the discharge orifice of the nozzle in engagement tightly with the lubrication fitting during the servicing of the fitting.

Other objects, the advantages and uses of the invention will be, or should become apparent after reading the following description and claims and after consideration of the accompanying drawing forming a part of this specification, in which:

Fig. 1 is a view showing the conduit and coupler in side elevation as applied to a lubrication fitting and constructed in accordance with my invention; and Fig. 2 is an elevation partly in section of the structural elevation illustrated in Fig. 1.

In general my improved lubricant conducting apparatus includes a conduit A comprising a long, metal, rigid hose including a swivel assembly B and a sheath C having an actuating gear, the coupling means includes an actuating collar E, and a snap-on coupler including a grab member F interconnected with the sheath C through a gear drive mechanism D. The lubricant receiving fitting G may be in the form illustrated in Figs. 1 and 2 or it may be of any suitable form of receptacle capable of closing the inlet gland holding the desired quantity of lubricant and acting as a seal against dust, grit or other particles which would cause a thickening of the lubricant.

With reference to Figs. 1 and 2 it may be seen that the conduit A is composed of a rigid hose 29 extending from an inlet coupling nut 28 to a swivel member 47 of the conduit. The sheath C is provided with a knurled portion 48 by which it may be turned upon the conduit for the purposes presently described. The hose 29 terminates at the swivel member 47, which enters a swivel member 49 the two being provided with tapering interacting surfaces by means of which the two swivel members are enabled to have a relative turning movement the one within the other and are adapted to be drawn more or less tightly together through the medium of a screw threaded extension 50 on the member 47 on which fits a wing nut 51 which operates against a washer 52 spanning the aperture in the member 49 whereby when the nut 51 is turned, the member 47 will be either eased or tightened within the member 49. A nipple 53 on the member 47 is secured in the outer end of the hose 29, and the sheath C at its outer end, carries a bevel gear 54 which is rigidly fixed to the sheath to be turned therewith. The member 49 is provided with a tubular, reduced extension 55, the outer end of which is externally screw-threaded for the reception of the internally screw-threaded tubular portion 56 of a chambered coupling member 57 having two oppositely extending apertured lugs 58 and 59. The swivel members 47 and 49 are shouldered or offset from their tubular extensions and, when fitted together, provide a joint which is strong, flat and the members of which are intimately related for the purposes hereinafter described.

Lubricant is free to pass through the apparatus through the bore $25^a$ of the hose or conduit 29, and longitudinally through the member 47 at $25^b$ and then laterally into the hub of the member 47 at $25^c$, and thence longitudinally of the member 49 and its extension 55, as at $25^d$. The latter passage terminates in the coupling member 57, and the outer end of the extension 55 is provided with a seat for a ball-valve 60, which is normally sustained in sealing position against its seat by the spring 61 supported on a flange in the valve chamber of the tubular portion 56 of the coupling member. The valve and spring chamber of the coupling member is extended through a narrow passage into a socket for the reception of the lubricant receiving nipple, or cylindrical body portion, of the fitting G the details of which will be presently described.

The socket of the coupling member 57 is provided with a compressible gasket 62 which seats against the flange which supports the valve-spring 61; and the passage from the valve chamber into the socket is continued undiminished through the gasket 62, and merges into the said socket which is deep and substantially twice the diameter of the passage. The swivel member 47 has the passage $25^c$ in its hub portion extended outwardly through its wall, and at this point the said passage is screw-threaded for the reception of the threaded end 63 of a screw, the body of which is enlarged at 64 and made smooth, and at its extreme outer end is provided with a slotted head 65 for the reception of a screw driver or similar instrument. The body 64 of the screw affords a journal bearing for the hub 66 of a beveled segmental gear 67, which is maintained in position by the head 65 of the screw, but is free to turn on the body of the latter under impulse from the gear 54.

As seen in Fig. 1, the bevel segmental gear 67 has extending from its outer surface two diametrically opposite pins 68 which are adapted to engage the outturned terminal ends 69 of a forked arm 70, the prongs of which fork embrace the hub 66 of the bevel gear 67. Thus, as the said gear is oscillated or turned in one direction or the other, one or the other of its pins 68 will engage with one or the other of the prongs of the forked arm 70, which is an angular terminal member of the actuating collar E. The collar E is internally flanged at 72 and surrounds the tubular extension 55 of the swivel member 49. The internal flange 72 offsets the collar E from the extension 55 sufficiently to enable said collar to surround the threaded extension of the coupler 57 and leave between the end of the latter and the said flange a chamber 73 in which a coiled spring 74 is housed, and which surrounds the extension 55. Thus, while the collar E is normally maintained in snug engagement with the swivel member 49 by the spring 74, the latter will permit, by compression, the actuating collar E to be slid longitudinally upon the extension of the coupler 57. Viewing Fig. 1, it will be seen that the collar E is provided with diametrically opposite outwardly extending pins 75 which play within the bifurcations of the inner arms 76 of the coupling grab levers F pivoted at 77 to the lugs 58 of the coupling member 57. The outer arms of the grab levers are slotted at 78 to embrace the lugs 58, and have their terminal ends formed into grab hooks 79 inturned to engage the fitting G as presently described.

It will now be understood that when the sheath C is turned slightly, the bevel gear 54 will be rotated, in turn rotating the bevel gear 67, one of the pins 68 of which, according to the direction of rotation, will engage a terminal end 69 of the arm 70, thus, shifting the collar E longitudinally of the swivel member 49 and compressing the spring 74, storing power therein. Such movement of the collar E shifts the pins 75 within the bifurcations of the inner arms 76, thus shifting outwardly the hooked ends of the coupling levers to release the grab hooks 79 from engagement with the fitting. Upon releasing the sheath C, the spring 74 will return the collar E to its normal position, causing the terminal ends 69 of the arm 70 to operate upon the pin 68, which in turn returns the gear 67 and the gear 54 and the sheath C to their normal positions. The movement in either direction is both easy and slight; and the operation just described may be carried out and easily effected regardless of the position to which the coupling has been shifted relatively to the conduit. It will be seen, therefore, that, regardless of the position of the fitting G on any part of a machine, the coupling can be quickly and easily applied and released by a short, easy turning movement of the sheath C. This eliminates the use of a second hand in adjusting the coupling to the fitting and the inconvenience of reaching into small spaces and difficult positions for the purpose.

My rigid conduit also avoids the necessity of supporting the hose (usually flexible or provided with loose, uncontrollable joints) with one hand, while holding the gun, compressor or lubricant supply means in the other, in an attempt to connect the coupling to the fitting; for, my swivel joint 47—49 can be set, with any desired degree of rigidity, in the exact position, or at the exact angle, desired as a preliminary to coupling the conduit to the nipple or fitting. When so set, the operator can accurately direct the coupling, with one hand upon the gun to the position, regardless of how difficult of access, where the fitting is set and, by slight pressure from the conduit, snap the coupler grab hooks upon the fitting preparatory to feeding lubricant thereto. And, after the coupling has been thus applied, if the lubricant supply means is not in a convenient or easy position for operation, it is only necessary to overcome friction at the joint 47—49, to enable the major conduit members to be shifted into any position for operation. All these manipulations are by one-hand gripping the lubricant supply means and offer no impediment to the free passage of the lubricant through the system. In Fig. 1, I have shown in full lines a position of the various parts wherein the passages $25^a$ and $25^d$ of the conduit are in axial alignment. In the dotted line sketch, I have shown a position of extreme adjustment on one side of the axis of the conduit. An adjustment to the same extent can be made on the opposite side of the longitudinal axis of the conduit, as will be readily seen. By turning the wing nut 51, the ease or freedom of movement of the swivel members can be regulated and adjusted, and this feat can be accomplished at any time regardless of the position of the parts relative to each other and without congesting or changing the diameter of the various parts of the passage through the conduit from its attachment to the supply means to its attachment to the fitting. It will also be seen that the movement of the sheath C required to manipulate the coupling grab levers is slight, a very slight movement either way of the said sheath giving a comparatively extensive movement to the gear 67, resulting in thrusting the collar E longitudinally a sufficient distance to either release the hooks 79 from the fitting or engage said hooks with the fitting. On the other hand, it will be seen that mere pressure of the hooked members upon the fitting will enable the said members to snap over the fitting and firmly clutch the same. This movement means that the bifurcated ends of the lever arms 76 will operate upon the pins 75 of the collar E, shifting the latter longitudinally, causing compression of the spring 74 and separation of the extensions 69 of the collar arms 70 from the pins 68 carried by the bevel gear 67. This is all independently of the sheath and its movement.

This fitting is shown partially in Figs. 1 and 2. Specifically, it consists of the upper, smooth and extended body portion or cylindrical barrel 40, the inlet end of which has an inturned flange providing a central, internal seat for a ball-valve 80, said valve being held to its seat by the spring 81, one end of which supports the ball and holds it to its seat with predetermined pressure. The other end of the spring 81 is supported upon an inturned flange 82, or if desired a plurality of spurs, which may be turned up from the metal of the barrel. By inverting the fitting, the ball may be dropped in place and then the spring, by engaging one end thereof with the flange or spurs 82 may be spun into place. The fitting is provided with a circumferential flange 83 which may be made angular, if desired, for application of a wrench, and below the flange the barrel of the fitting is externally screw-threaded, as at 84 for insertion, in the usual manner, in the usual tapped opening at the end of the gland or passage leading to the bearing to be lubricated. The fitting above the flange 83 is provided with a circumferential groove 85, the bottom of which terminates at the circumference of the flange and the top of which is formed by the slightly inclined bottom of a skirt 86, the top of which latter is slightly convexed from the circumference of the barrel or body portion 40 to the circumference of the skirt.

Thus the fitting is provided with a groove the shape of which corresponds with the hooked ends 79 of the lever arms 78; but, said groove is sufficiently larger than the said hooked ends 79 to enable the movement of said ends relatively to the skirt 86 to both release and engage the latter automatically or otherwise. The hooks will, under sufficient pressure, slide down the convex outer surface of the skirt 86 and snap under the same by freely entering the groove 85. If the grease is not congealed or stiffened in the fitting or in the gland, it is only necessary to snap the coupling onto the fitting, and this can be done regardless of the position of the fitting on the machinery, and regardless of the angle of approach thereto.

The angle of approach may be difficult, or it may be a comparatively straight approach, as in Figs. 1 and 2, in which event the coupling can be snapped on by a straight outward thrust. It will be seen that, regardless of the angle of approach, the long body of the fitting, beyond its skirt 86, enters the deep socket of the coupling, and the two devices immediately cooperate to cause the further approach of the coupling to the fitting to be in absolutely right lines regardless of the angle of the gun and hose to the coupling. This is important since thereby the two hooked ends of the yielding arms 78, are caused to ride down the inclined surface of the skirt 86 and simultaneously snap thereunder, thus making a quick and accurate coupling. These features of construction are equally important in uncoupling the parts; for, the parts, as shown in Fig. 2, can only be separated by first turning the sheath C or shifting the collar E longitudinally, causing the hooks 79 to recede from the skirt 86, and then drawing the coupling in a right-line away from the fitting. There is, then, no lagging of the parts nor detention of the hooks. When the fitting is connected to the coupler, the gasket 62 will be compressed and the seal between the parts will be tight against the passage of lubricant; and as there can be no relative angular movement between the coupled parts, the seal is perfect at all times during use. On the other hand, the swivel joint 47–49 between the coupling and hose enables movement of the hose and gun relatively to the coupler and fitting without disturbing the passage of lubricant or putting strain upon the coupled parts. These various functions and advantages are important and upon them I desire to lay stress.

When the coupling is applied to the fitting lubricant may be admitted through the passage 25ᵃ in the hose, the passages 25ᵇ, 25ᶜ and 25ᵈ of the swivel members, past the valve 60, through the gasket 62 of the coupling and past the valve 80 of the fitting and into the chamber of the fitting and through the latter into the gland of the machinery and to the bearing of the latter.

At this time a slight rotary movement of the sheath C upon the hose will release the coupling members 79 from the skirt 86 of the fitting, whereupon the ball-valve 80 will seal the entrance to the fitting and the ball-valve 60 will seal the chamber of the coupling. This is all automatically carried out and requires neither care nor attention on the part of the operator, who knows that, when he thus releases the coupler from the fitting the latter will be sealed as well as the source of supply to prevent exudation and loss of lubricant.

The solid hose with a single swivel joint, which can be so manipulated as to render the entire conduit rigid, is of importance, since the apparatus may be more easily controlled and can be manipulated with one hand for coupling purposes and can be directed with facility to the point of use, regardless of the angle of approach. Strength, economy and durability are also characteristics of importance. The single joint is also of such structure as to allow a wide range of adjustment of the coupler relatively to the hose, and such adjustment can be made quickly by pressure upon the coupling.

The structure of the snap-on coupling is of great importance, since it avoids handling the same for coupling purposes; and may be automatically applied; and quickly uncoupled by a slight movement of the sheath C which movement may also be used for applying the coupler.

It is to be understood that the embodiments of the invention herein set forth are presented for the purpose of illustration only, and various changes may be made without departing from the spirit of the invention and the scope of the claims.

I claim:

1. A conduit for a lubricating system comprising two tubular members and a swivel joint connecting the same; a coupling carried by one of the tubular members; a sheath carried by the other tubular member; and means between the sheath and the coupling enabling the former to operate the latter.

2. A connector adapted to be coupled to a nipple comprising a barrel having a bore for communication with the bore of a nipple, a bracket member extending in alignment with said barrel, a grab for grabbing a nipple pivoted on said bracket so as to have a nipple engaging surface shiftable transversely to grab a nipple to hold the latter against retraction from coupled position, and rotatable means mounted on the barrel to shift said grab from grabbing to releasing position, or vice-versa.

3. A nipple connector adapted to be coupled to a nipple comprising a barrel having a bore for communication with the bore of a nipple, a bracket member extending in alignment with said barrel, a grab for engaging a nipple pivotally supported on said bracket so as to be shiftable to grab a nipple and to hold the latter against retraction from coupled position, resilient means tending to shift said grab, means shiftable on said barrel to move said grab to releasing position, a sleeve rotatably mounted on a portion of said barrel for operating said shiftable means, and sealing means within the bore of said barrel engageable with the end of said nipple when the latter is coupled to said barrel.

4. A nipple connector adapted to be coupled to a nipple comprising a barrel having a bore for communication with the bore of a nipple, a bracket member extending in alignment with said barrel, a grab for engaging a nipple pivotally supported on said bracket so as to be shiftable to grab a nipple and to hold the latter against retraction from coupled position, resilient means tending to shift said grab to uncoupled position, means shiftable on said barrel to move said grab to releasing position, means rotatably associated with said barrel for operating said shiftable means, and sealing means within the bore of said barrel engageable with the end of said nipple when the latter is coupled to said barrel.

CLARK W. PARKER.